May 29, 1923.

E. M. BROGDEN

APPARATUS FOR THE SIZING AND DISTRIBUTION OF FRUIT

Filed Oct. 3, 1922  2 Sheets-Sheet 1

1,457,143

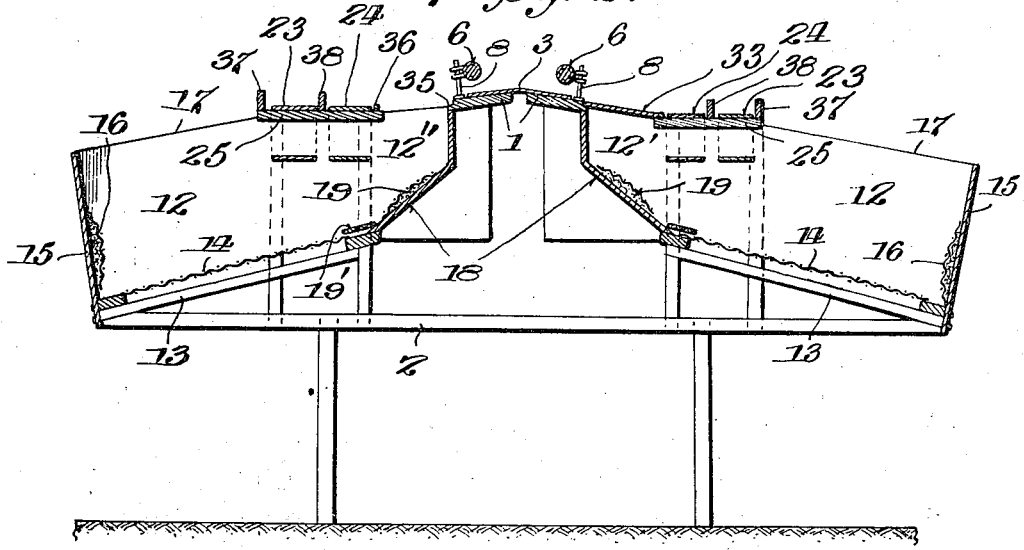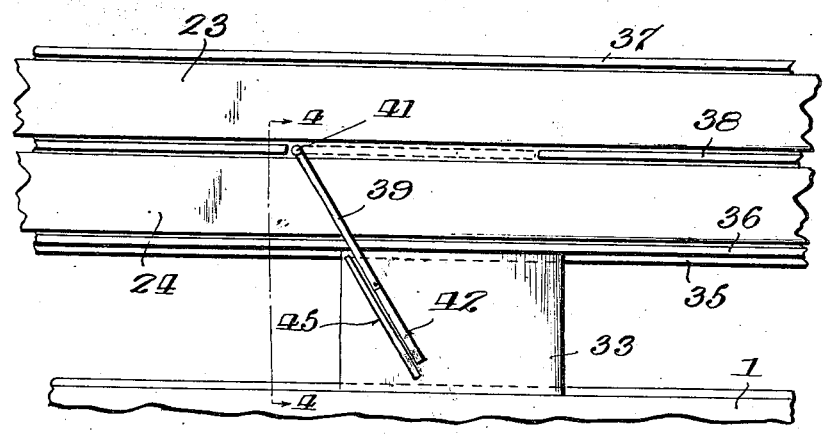

Patented May 29, 1923.

1,457,143

UNITED STATES PATENT OFFICE.

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA.

APPARATUS FOR THE SIZING AND DISTRIBUTION OF FRUIT.

Application filed October 3, 1922. Serial No. 592,153.

*To all whom it may concern:*

Be it known that I, ERNEST M. BROGDEN, a citizen of the United States, residing at Winter Haven, county of Polk, and State of Florida, have invented certain new and useful Improvements in Apparatus for the Sizing and Distribution of Fruit; and I do hereby declare the following to be a full, clear, and exact description of the invention, such as will enable others skilled in the art to which it appertains to make and use the same.

This invention relates to apparatus for the sizing and distribution of fruit in separate sizes into bins from which the fruit is packed for shipment. While the apparatus is designed for the sizing of any fruit of general globular shape capable of treatment in a sizing apparatus of this general character, it is especially adapted for the sizing of citrus fruit, such, for example, as oranges, grapefruit, and tangerines.

The principles of my invention are illustrated by the specific concrete embodiment thereof in the hereinafter described apparatus, which, although adapted for the general use hereinbefore referred to, has certain practical advantageous features for the sizing of oranges and the like. Hence, for the sake of brevity, where reference is made to specific fruit treated such reference will be confined to oranges.

In the sizing of oranges, provision is usually made for separating the fruit conveyed along the runway of the apparatus into nine sizes, fruit of those respective sizes being distributed from the sizing element of the apparatus into respective bins, at the sides of which the packers are employed in packing the fruit piece by piece from the bins into boxes for shipment.

In the customary packing house installation the freshly picked fruit goes through a series of apparatus including washers, scrubbers, driers and polishers, and terminating with the sizers, a sufficient number of the latter being provided to take care of the normal maximum quantity flow of fruit from the preceding apparatus of the series. In the type of sizing apparatus customarily employed, one fruit receiving bin is provided for each of the resulting sizes of fruit. In the average run of fruit through the apparatus, separation into sizes and distribution to the respective bins occur in quantities for each size not sufficiently varying to overrun the capacity of its bins or of the operators ranged alongside to dispose of it. Variations from the normal or average run of fruit, however, not infrequently occur particularly in certain regions or districts of the fruit production, in which variations the fruit runs to a few, generally from one to three, predominating sizes at such a rate as to exceed the capacity of the maximum number of packers who can be accommodated at the bins designed to receive such fruit to dispose of the same. The result is an overflow into adjoining bins with a consequent mixing of sizes or a shutting down of the sizer with consequent decrease of output and interruption of work throughout the entire installation referred to.

Attempts have heretofore been made to avoid these objectionable results by providing the sizing apparatus with bins of sufficient width and resulting capacity to accommodate fruit of any size running to a greater than normal quantity. In such an apparatus, however, the increased floor space of the bin results in an objectionable spreading of the fruit thereover which makes it difficult for the packers to reach all the fruit. This spreading of the fruit is particularly objectionable during the normal run of the fruit when less than the maximum number of packers required for abnormal runs are employed as it necessitates their moving from place to place along the sides of the bin to reach all of the fruit. Other attempts have heretofore been made to overcome the difficulties mentioned by providing the bins with laterally adjustable sides to increase their capacity as required. Since in the customary sizing apparatus the bins are in a series extending parallel with the sizing element, a lateral adjustment of the side of one bin to increase its capacity results in decreasing the size and capacity of an adjacent bin of the series, and thus is apt to interfere with the normal distribution of fruit to such a bin.

An object of the present invention is to provide a sizing apparatus capable of extending the distribution of fruit running to one or more predominating sizes in such manner as to provide an increased and convenient area of presentation of the sized fruit to enable the required number of packers to quickly and readily dispose of the same.

Another particular object of the invention is to provide an apparatus capable of such extended distribution of fruit running to one or more predominating sizes without affecting the normal distribution of fruit of other sizes in the run.

Still another object of my invention is to provide an extension sizer of the character referred to providing for such a distribution of the sized fruit as to permit a uniform working space for each packer adjacent the fruit receiving bins regardless of the variations referred to in the run of the fruit.

A further object of the invention is to provide in association with a sizing element of standard length a suitable distributing apparatus to permit the extended distribution of the sized fruit hereinabove referred to.

My invention contemplates the employment of a sizer of any suitable kind, so far as the mere separation of the fruit into different sizes as distinguished from the distribution of the sized fruit is concerned. Preferably, such a sizer having a longitudinally disposed fruit runway and with graduated sizer outlets or elements therealong to deliver laterally therefrom fruit of different sizes from different longitudinal portions is employed. Fruit-receiving bins of any suitable type are disposed preferably in a series parellel with the sizing element with a bin for each sizer outlet and each bin disposed with a bin-inlet or passageway to receive directly from the respective sizer outlet the normal flow of fruit. To extend the distribution of sized fruit during abnormal runs, auxiliary or secondary, bins are employed for the reception of the fruit of sizes predominating in quantities beyond the capacity of the first mentioned primary or regular bins. These auxiliary bins are desirably but not necessarily of the same dimensions and capacity as the primary bins, and preferably also constitute an extension of the series beyond the terminus of the sizing element. To thus extend the distribution of the predominating sizes of fruit, suitable deflecting means are employed, normally out of the path of movement of the fruit from the sizer outlets to the main fruit-receiving bins and movable at will into such path to divert the fruit from such bins, in association with conveying and distributing means to convey the separate streams of sized and diverted fruit to the auxiliary bins and to distribute them thereamong. In the best embodiment of my invention, such conveying means handles only the particular size or sizes of fruit that may be running abnormally high.

It is apparent from the foregoing, that one of the particular features of the invention is the provision of a greater number of bins than the sizes of fruit which the sizing element is designed to deliver, and the provision of means for controllably varying the flow-direction of the sized fruit with respect to the bins whereby any stream-flow of the sized fruit running beyond the capacity of the bin designed for its reception during a normal run may be diverted to an additional bin, this being accomplished without disturbing the normal flow of fruit of other sizes to the bins designed for their reception.

A typical embodiment of the novel apparatus constituting my invention, offering practical advantages particularly in the treatment of citrus fruit and the like, but not confined in its use thereto, is illustrated in the accompanying drawings, and described in detail hereinafter. It is to be understood, however, that the embodiment referred to is merely illustrative of the broad principles involved and that the broad scope of the invention includes various other specific constructions capable of functioning in accordance with said principles.

In the drawings:

Fig. 1 is a plan view of the apparatus;

Fig. 2 is a vertical transverse sectional view on the line 2—2 of Fig. 1 looking in the direction of the arrows;

Fig. 3 is a plan view on an enlarged scale of a portion of the apparatus as shown in Fig. 1;

Fig. 4 is a vertical sectional view on the line 4—4 of Fig. 3, looking in the direction of the arrows.

The invention may be embodied in a single or double sizer as desired, the particular embodiment now referred to showing a double sizer, that is, one employing a double runway for the fruit to be sized and two sets of sizing elements disposed on opposite sides thereof for delivering sized fruit from each side laterally to an adjacent series of bins. Since the parts on opposite sides are duplicates, each such duplicate part will be referred to by the same term and reference numeral.

As hereinbefore stated, the sizing part or element of the apparatus may be of any suitable kind, designed to deliver fruit of different sizes at different portions therealong. In the illustrative apparatus, the sizing element comprises a double runway for the fruit formed by the two oppositely inclined plates 1, 1, suitably mounted above the foundation framework 2 to extend longitudinally of the apparatus, and over which, in flexed condition to conform to the opposite inclination of the plates, extends the upper lap of an endless conveyor-belt 3, which is the main or sizer belt proper, said belt being trained about pulleys 4 suitably journaled in the framework of the machine and driven in any suitable manner, for example as indicated at 5 by a sprocket and chain from a counter shaft of the machine. The opposite sides or edges of the runway are formed each by a series of rolls 6 mounted upon a flexible shaft 7 journaled adjustably as to height above the floor of the runway in bearings adjustably mounted upon the supporting rods 8 upstanding from the floor of the runway beyond the sides of the conveyor belt, as shown in Fig. 2. The shafts 7 are driven in any suitable manner, as for example from the shaft 9 through the bevel gears 10, which shaft 9 in turn is driven from a counter shaft of the machine by the sprocket and chain drive indicated at 11.

Each roll 6 is formed of two portions of different diameters. The portion 6' of the lesser diameter is the effective sizing element, the diameter being such as to space the roll above the runway a sufficient distance to provide an outlet to size the fruit. The portion 6'' is of a sufficiently greater diameter to retain the fruit passing therealong upon the runway and functions in association with the runway conveyor to advance the fruit of a size too large for the preceding sizer outlet to the next sizer outlet. Each of the portions 6' which provide the sizer outlets are of gradually decreasing diameters throughout the series to provide the required separation of the fruit into different sizes. The fruit to be sized is delivered to the receiving end of the runway belt from the chute 12'; and by reason of the opposite inclinations of that belt is conveyed in two parallel streams in contact with the sizing rolls 6, the inclination of the runway and the rotation of these rolls causing the fruit to emerge from beneath the portions 6' of these rolls laterally of the runway at different longitudinal portions thereof depending upon the size of the fruit, in a well known manner. The rolls, successively spaced above the runway, therefore, cooperate therewith to provide sizing outlets for the fruit, delivering separate streams of sized fruit for distribution to the packers.

In the illustrative apparatus, primary bins 12 are provided in a series longitudinally disposed, parallel to and co-extensive with the sizing portion of the apparatus, as shown in Fig. 1, equalling in number the sizer outlets, with a bin for each sizer outlet. In the illustrative apparatus, the streams of sized fruit emerging from the sizer outlets are delivered to the respective fruit receiving bins 12 by gravity, the bins being disposed, as shown in Fig. 2, at a level below the sizer outlets, and each having an inlet or inlet passageway 12'' extending from a respective sizer outlet and immediately therebelow to the fruit-holding portion of the bin.

The bins may be of any suitable construction. As shown in Fig. 2, they are supported upon lateral extensions of the lower framework 2 of the apparatus. As also shown in Fig. 2, the floor of each bin is formed of an inclined open framework 13 over which canvas or other flexible material is extended as indicated at 14, to avoid bruising the fruit as it is deposited thereon or rolls thereover, and the outer side board 15 of the bin is also suitably padded as indicated at 16 for a similar purpose. Partitions 17 each form a common side wall for adjacent bins and these partitions extended form the side walls of the inlet passages 12''. The floor 18 of each of these inlet passages is inclined, as shown in Fig. 2, downwardly toward the floor 14 of the bins and also suitably padded, as indicated at 19, to prevent the bruising of the fruit in its drop from the sizer outlets. A fiber strip 19' is positioned at the junction of the inclined floors 14 and 18 of the bin and its inlet passage for a like purpose.

The primary bins 12 are of sufficient capacity to take care of the average or normal run of fruit in its respective sizes with ready access thereto by the packers, but they need not be designed to accommodate increased quantities resulting from abnormal runs in predominating sizes. To take care of such increased quantities, secondary or auxiliary bins are provided, disposed, in the illustrative apparatus, as an extension of the series of bins 12 beyond the terminus of the sizing element of the apparatus. Each of the auxiliary bins is desirably of the same dimensions as the primary bins 12. As many of such auxiliary bins may be employed as is found desirable. Usually one such bin (that is, one on each side of the machine in case of a double sizer) for each size of fruit likely to run in abnormal quantities will be found sufficient, and the machine may be constructed with as many such auxiliary bins as experience indicates is the number of sizes apt to run abnormally high at any one time.

In the illustrative apparatus three auxiliary bins 20, 21 and 22 on each side of the sizer are shown, of construction and mounting similar to that of the primary bins 12 and forming an extension of the series of bins beyond the sizer portion or element of the apparatus. The means employed for conveying fruit to these auxiliary bins, in the illustrated apparatus, comprises two juxtaposed endless conveyor belts 23, 24, which may be conveniently designated as extension belts. These extension belts have their upper runs upon a supporting plate 25 mounted over and longitudinally of the series of main and auxiliary bins, parallel to the sizer outlets and laterally spaced therefrom, such spacing providing an unobstructed mouth or inlet to each of the passageways 12'' leading from the sizer outlets to the primary bins 12. The extension belts 23 and 24 are trained over pulleys 26, 27 and 28, 29 suitably journaled in brackets 30 extending from the opposite ends of the apparatus, and driven in any suitable manner, as for example by the shaft 31, which in turn is driven by the sprocket and chain drive indicated at 32 from a countershaft of the apparatus. The extension belts are designed each to convey a stream of one size of fruit at a time to one of the auxiliary bins; and the streams of fruit to be thus conveyed are delivered from the respective sizer outlets from which they emerge upon the extension conveyor belts by deflecting means operable at will to divert the streams of sized fruit from their normal flow to respective primary bins. Adjustable guide means associated with the extension belts are employed to guide the separate diverted streams of sized fruit to said belts and to distribute each of such streams to a separate auxiliary bin or to a plurality of such bins. More than two extension belts (two on each side of the machine in the case of a double sizer) may be employed if desired but it has been found that even where the lot of fruit under treatment contains three or more sizes so predominating in quantity as to exceed the capacity of the primary or regular bins designed therefor it rarely occurs that more than two of such predominating sizes are running high enough at the same time to overflow their regular bins.

In the illustrative apparatus the means employed for diverting sized fruit from its normal flow comprises chute boards 33. These chute boards, which may be conveniently designated deflectors, are each of sufficiently greater length than the reduced portion 6' of each roll providing the sizer outlet to permit a spreading of the fruit over the chute boards in the direction of travel of the extension belts. They are of a width to extend, in the inclined position shown in Fig. 2, from a sizer outlet to the innermost extension belt and when in that position they cover that portion of the bin inlet passage 12'' in line with the sizer outlet and normally receiving fruit therefrom by gravity. When a chute board is in the position indicated in line with a sizer outlet and over a corresponding bin inlet, the fruit emerging from that sizer outlet is diverted from that bin-inlet and rolls over the deflector to said belt.

Provision is made for adjusting each of the deflectors from a position not affecting the normal flow of the streams of sized fruit to the respective bins intended to receive them to a position adjacent a sizer outlet to divert the emerging fruit from its normal course in the manner stated. In the illustrative apparatus, a longitudinal slideway is formed of complementary members adjacent the sizer outlets and the innermost of the conveyor belts. In the embodiment given, one member of the slideway is formed by the free side edge of the runway plate 1 and a rail or nosing 35 longitudinally disposed below its rim thereagainst. The other and complementary member of the slideway is formed upon the adjacent surface of the conveyor supporting plate 25 by a rail 36 upstanding from the upper surface of that plate and inset from its edge. The rail 36 is of a height to extend above the upper surface of the extension belts only sufficiently to perform the additional function of a guide which prevents the fruit travelling on the inside extension belt from running off the same, but to offer no obstruction to the passage of the fruit in its rolling movement over the deflector to either of the belts. A chute board or deflector for each sizer outlet is preferably employed. Preferably also, and as shown in Fig. 1, the portion 6'' of each roll which does not function as a sizer outlet is of a sufficiently greater length than the portion 6', which does so function, to permit the chute board to be moved in alinement with the former and entirely out of fruit receiving relation with the latter. With the arrangement shown each deflector can readily be moved longitudinally upon the slideway from a position in line with the reduced portion 6' of the roll forming the sizer outlet to position in line with the portion 6'' of greater diameter. It is obvious that the first mentioned position is that operative for diverting the fruit from its normal flow from the sizer outlet and that the second mentioned position permits such normal flow, the flow of fruit then being from the sizer outlet directly to a bin 12 through its bin inlet passage 12.''

While I preferably employ sizing rolls of the type mentioned, any other suitable sizing rolls or elements forming with the fruit runway sizer outlets, may be employed. For example, rolls each of uniform diameter and forming a sizing element or outlet throughout its entire length may be employed. Where such sizing rolls are employed the chute boards or deflectors may obviously be removed from the slideways for operation of the apparatus during normal runs of the fruit, and one or more returned and properly positioned adjacent one or more sizer outlets for diverting fruit of abnormal runs emerging therefrom.

In the illustrative apparatus the means, hereinbefore referred to, for directing the diverted fruit in separate streams of different sizes on to the respective extension belts and to distribute such streams to respective auxiliary bins are formed by fixed and adjustable guide-rails mounted upon the belt-supporting plate 25. A fixed and non-adjustable guide rail 37 is mounted, as shown in Fig. 2, upon the upper surface of the extension-belt support 25 in the clearance beyond the outer edge of the outer extension belt, and extends continuously, as shown in Fig. 1, longitudinally of the series of bins to form an outer guide rail which prevents fruit diverted to the outer extension belt from running off the outer edge thereof. In the clearance between the two extension belts, an adjustable intermediate guide-rail 38 is mounted as shown in Figs. 1 and 2. As also shown in Fig. 1, this intermediate guide rail extends the length of the sizer portions of the apparatus and therebeyond, terminating short of the last auxiliary bin. That portion of the intermediate guide rail extending the length of the sizer part of the apparatus is formed of hinged sections or gates. As shown particularly in Fig. 4, each such section or gate is formed with a main body portion 39, a right-angled offset portion or hub 40, through which the pivot pin 41 loosely extends, to offset the main body portion 39 above the supporting plate 25 a sufficient distance to clear the extension belts and the rail 36 when the gate is swung transversely, and a terminal portion 42 slightly inclined upwardly from the body portion to permit, with the loose pivot pin 41, the swinging of the gate across the surface of the inner belt conveyor and over the inclined chute board or deflector. The rail sections or gates referred to are made of sufficient length so that each, when swung as indicated, extends its terminal over the deflector to a point closely adjacent a sizer outlet and with the gate so inclined therefrom forwardly in the direction of the path of travel of the extension belts as to guide fruit emerging from such sizer outlet over the surface of the deflector upon the outermost of the two extension belts. Such an adjustment of one of the gates, with its terminal portion extending over a deflector 33, in position to guide fruit emerging from a sizer outlet over that deflector upon the outermost extension belt is shown in Fig. 1. Any suitable means may be provided for retaining the hinged rail sections or gates in adjusted positions. In Fig. 4, the gate is shown apertured as at 43 for the insertion therethrough of a pin 44 or other suitable fastening element having sufficient frictional engagement with the support below to retain the gate in position.

When a gate of the intermediate guide rail is not serving in the manner stated over a deflector positioned in line with a sizer outlet, that deflector delivers the fruit to the inner extension belt only, and the diverted fruit is conveyed by that belt between the inner and intermediate guide rails to the auxiliary bins. Fig. 1 shows a deflector 33 thus diverting fruit from a sizer outlet.

The chute boards forming the deflectors referred to are desirably, and as shown in Fig. 1, each provided with a fixed guide rail 45, adjacent its advanced end and inclined in the direction of travel of the extension belts. When a chute-board is in fruit-diverting position with respect to a sizer outlet and a gate 38 is swung thereover to direct the diverted fruit to the outer extension belt, the fixed guide rail 45 provides a limiting stop accurately positioning the gate with respect to the sizer outlet. When a chute board is in use, however, to divert fruit to the inner extension belt only, and a gate 38 is consequently not swung over the board, the fixed guide rail 45 functions to prevent the fruit from running off the advanced end of that board.

The innermost rail 36 extends beyond the last sizer outlet to the end of the apparatus over the last auxiliary bin 22, with a cut-out or gap 36' therein slightly in advance of the terminus of the intermediate guide rail to permit delivery of fruit from both extension belts to the last auxiliary bin, as shown in Fig. 1. The portion of the inner guide rail 36 beyond the sizer outlets is increased in height over that portion extending along the sizer outlets to provide for hinged sections or gates therein. Two such sections or gates are indicated at 46 and 47 in Fig. 1. These sections are substantially the same in construction as those of the intermediate guide rail 38 hereinbefore referred to except for the omission of the inclined terminal portions 42, such terminals not being required since the gates 46 and 47 are not intended to be swung over the inclined chute boards or deflectors. The gates of the innermost rail guide are disposed each adjacent an auxiliary bin, as shown in Fig. 1, and are designed to be swung across the surface of the inside extension belt to terminal contact with the closed intermediate rail sections. When thus adjusted they open the rail guide 36 to provide delivery from the inside extension belt to the auxiliary bins. Fig. 1 shows in full lines the gate 47 swung to open position to provide delivery of the fruit from the inside extension belt 24 to the auxiliary bin 21, and the gate 46 in closed position preventing any delivery of fruit from that conveyor belt to the auxiliary bin 20. Fig. 1 also shows in dotted line the gate 47 closed and the gate 46 open to provide delivery of fruit from the inside extension belt to the auxiliary bin 20.

The intermediate guide rail 38 terminates, as shown in Fig. 1, short of the last auxiliary bin of the series. Beyond such termination, a guide rail 48 is extended across the two extension belts at an inclination forwardly of their path of travel from the outer guide rail 37 to the last or terminal portion of the innermost guide rail 36, as shown in Fig. 1, and provides, in association with the traveling extension belts means for delivering fruit from the outermost belt to the last auxiliary bin 22 of the series.

In addition to the delivery referred to of fruit from the outside extension belt to the last of the auxiliary bins, distribution of fruit from that belt to other auxiliary bins of the series may be had by the proper adjustments of gate sections formed in that portion of the intermediate guide rail 38 extending beyond the sizer outlets. Two such gate sections are indicated at 48, 49 in Fig. 1. If either of those gate sections is swung to contact its terminal with the outer guide rail 37, as shown in the dotted line positions of the two sections in Fig. 1, it is obvious that the fruit advancing on the outer belt toward such a gate section will be diverted from that belt to the inner belt and may therefrom be distributed to other auxiliary bins of the series.

By the arrangement referred to, fruit diverted from the sizer outlets upon the extension belts may be distributed from either of said belts to any of the auxiliary bins.

During the normal run of the fruit, and generally in any event until one or more bins have been filled, the deflectors are retained in inoperative position. Should a predominating size appear in the run in quantities faster than the packers can remove such fruit from its bin and so as to cause overflow of such bin, one of the deflectors is moved on its slideway to operative position in line with the sizer outlet from which that fruit is emerging, and the fruit is thereby diverted to either one of the two extension belts as desired. If such fruit is to be diverted to the outside extension belt the gates of the intermediate guide rail are adjusted to the positions shown in full lines in Fig. 1 and the diverted fruit is delivered to the auxiliary bin 22. Or, if such fruit of a predominating size is running in quantity beyond the capacity of the auxiliary bin 22, one of the gate sections of the intermediate guide rail beyond the sizing element is thrown to the dotted-line position shown in Fig. 1 to deliver the fruit from the outer to the inner extension belt and therefrom, by an opening of an advanced gate section of the inner rail 36, to another auxiliary bin.

Should the fruit be running simultaneously to two predominating sizes, two deflectors are moved to operative position with respect to the two sizer outlets from which such fruit is emerging, and the fruit of such predominating sizes are diverted in the manner hereinbefore described to the two extension belts and delivered therefrom to separate auxiliary bins.

What I claim is:

1. Apparatus for sizing fruit which comprises the combination, with sizing means having a series of graduated sizing outlets, and a cooperating series of receptacles each arranged normally to receive sized fruit delivered from a corresponding one of said outlets, of auxiliary receptacle means, and means whereby fruit delivered from any of said outlets may be diverted to said auxiliary receptacle means without interfering with the normal delivery of fruit from the other outlets to their respectively cooperating receptacles.

2. Apparatus for sizing fruit which comprises the combination, with sizing means having a series of graduated sizing outlets, and a series of primary bins, one for each outlet, into which fruit is normally delivered from said outlets, of a plurality of auxiliary bins, conveyor means arranged to deliver thereinto, means whereby delivery of fruit into one or more of said primary bins may be cut off and diverted to said conveyor means, and means operative to segregate different sizes of fruit delivered to said conveyor means and to ensure delivery of the different sizes by said conveyor means to different ones of said auxiliary bins.

3. The combination with a fruit sizer having a longitudinally disposed fruit runway provided with a series of graduated discharge outlets to size said fruit, of a series of bins disposed with inlets each normally to receive a stream of sized fruit from a sizer outlet, an endless conveyor adjacent said sizer outlets, deflector means normally out of the paths of movement of said streams of sized fruit from said sizer outlets to said bin inlets but movable into any one of said paths to divert the corresponding stream of fruit emerging from its sizer outlet away from a corresponding bin inlet to said conveyor, and auxiliary bins disposed to receive fruit from said conveyor.

4. The combination with a fruit sizer having a fruit runway provided with a series of graduated discharge outlets to size said fruit, of a series of bins disposed adjacent said outlets to receive sized fruit and comprising a greater number of bins than the number of said sizer outlets, a plurality of fruit conveyors each having a path of travel longitudinally of said series of bins, means for directing fruit from a plurality of said sizer outlets separately on to said conveyors whereby each conveyor receives but one size of fruit, and means for distributing said sized fruit from each of said conveyors among a plurality of said bins.

5. The combination with a fruit sizer having a fruit runway provided with a series of graduated discharge outlets to size said fruit, of a series of bins for the reception of said sized fruit, said series having a bin for each said sizer outlet with an inlet positioned to receive fruit directly therefrom by gravity, a plurality of auxiliary bins, means adapted to be interposed across said bin inlets to divert sized fruit thereover from said discharge outlets, and conveyor means delivering said diverted fruit to said auxiliary bins.

6. The combination with a fruit sizing element constructed to deliver sized fruit at different longitudinal portions, of two juxtaposed endless conveyors horizontally disposed parallel to said sizing element at a lower level and laterally spaced therefrom, a chute-board interposed between said sizing element and the nearest of said conveyors, and a guide rail mounted between said conveyors having hinged sections adapted to be swung across said conveyor nearest said sizing element and over said chute-board to a point adjacent said sizing element, and bins disposed in fruit-receiving relation to said conveyors.

7. The combination with a fruit sizer having a fruit runway provided with a series of graduated discharge outlets to size said fruit, of a series of bins for the reception of sized fruit, said series having a bin for each said sizer outlet with an inlet passage positioned below said sizer outlet to normally receive fruit directly therefrom, a plurality of auxiliary bins, chute-boards normally in positions not obstructing said bin inlet passages but each movable to a position covering a separate bin inlet passage to receive fruit from the corresponding sizer outlet, and conveyor means arranged to deliver fruit from said chute-boards to said auxiliary bins.

8. The combination with a fruit sizer having a fruit runway provided with a series of graduated discharge outlets to size said fruit, of bins disposed in a series parallel to said fruit runway and at a lower level than said sizer outlets, said series having a bin for each said sizer outlet with an inlet disposed directly therebelow to receive fruit directly therefrom, a plurality of auxiliary bins, conveyor means having a path of travel over said series of bins and arranged to deliver fruit to said auxiliary bins, and deflector means adapted to be interposed between said conveyor-means and said sizer outlets and over said bin inlets to divert sized fruit to said conveyor means.

9. The combination with a fruit sizing element constructed to deliver fruit at different longitudinal portions, of bins in a series coextensive with said sizing element, said bins having inlets disposed to normally receive fruit directly from said sizing element, auxiliary bins forming a longitudinal extension of said series of bins beyond said sizing element, and diverting, conveying and distributing means operable at will to divert fruit from said bin inlets and to convey and distribute diverted fruit segregated as to sizes to said auxiliary bins.

10. The combination with a fruit sizer having a longitudinally disposed fruit runway provided with a series of graduated discharge outlets to size said fruit, of a longitudinally disposed series of bins adjacent said sizer outlets at a level therebelow and with inlets disposed to receive sized fruit directly from said sizer outlets by gravity, auxiliary bins forming a longitudinal extension of said series beyond said sizer outlets, a plurality of juxtaposed fruit conveyors extending over all of said bins and arranged to deliver fruit to said auxiliary bins, deflector-means adjustable to different longitudinal positions with respect to said sizer outlets for diverting sized fruit from a plurality of said sizer outlets separately on to said conveyors whereby each said conveyor receives but one size of fruit, and means for distributing said diverted fruit from said conveyors to said auxiliary bins.

11. The combination with a fruit sizer having a longitudinally disposed fruit runway provided with a series of graduated discharge outlets to size said fruit, of a longitudinally disposed series of bins adjacent said sizer outlets at a level therebelow and with inlets disposed immediately below said sizer outlets to receive sized fruit directly therefrom by gravity, auxiliary bins forming a longitudinal extension of said series beyond said sizer outlets, a plurality of juxtaposed fruit conveyors extending over all of said bins, spaced from said sizer outlets and at a level therebelow, chute boards movable between said sizer outlets and the adjacent conveyor and longitudinally thereof over said bin-inlets to divert different sizes of fruit from said bin-inlets to said conveyors depending upon the longitudinal positions of said chute-boards, and guide rails associated with said conveyors and adjustable in position with respect to said conveyors, said chute boards and said auxiliary bins to guide diverted fruit in separate streams as to sizes each to a separate one of said conveyors and to distribute said fruit to respective auxiliary bins.

In testimony whereof I hereunto affix my signature.

ERNEST M. BROGDEN.